US012712281B2

(12) United States Patent
Hu et al.

(10) Patent No.: US 12,712,281 B2
(45) Date of Patent: Aug. 18, 2026

(54) HOLOGRAPHIC LEAKY-WAVE ANTENNA AND ELECTRONIC APPARATUS

(71) Applicant: BOE TECHNOLOGY GROUP CO., LTD., Beijing (CN)

(72) Inventors: Yiqun Hu, Beijing (CN); Zongmin Liu, Beijing (CN); Jia Fang, Beijing (CN); Feng Qu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 84 days.

(21) Appl. No.: 18/867,686

(22) PCT Filed: Mar. 31, 2023

(86) PCT No.: PCT/CN2023/085300
§ 371 (c)(1),
(2) Date: Nov. 20, 2024

(87) PCT Pub. No.: WO2024/197761
PCT Pub. Date: Oct. 3, 2024

(65) Prior Publication Data
US 2025/0329934 A1 Oct. 23, 2025

(51) Int. Cl.
*H01Q 13/20* (2006.01)
*H01Q 3/24* (2006.01)
*H01Q 3/44* (2006.01)

(52) U.S. Cl.
CPC ............... *H01Q 13/20* (2013.01); *H01Q 3/24* (2013.01)

(58) Field of Classification Search
CPC .. H01Q 21/0012; H01Q 3/44; H01Q 15/0086; H01Q 21/064; H01Q 21/065;
(Continued)

(56) References Cited

U.S. PATENT DOCUMENTS 12,451,620 B2 * 10/2025 Wu .......................... H01Q 3/24
2019/0334234 A1 * 10/2019 Quarfoth ................ H01Q 3/443
(Continued)

FOREIGN PATENT DOCUMENTS

CN 110034416 A 7/2019
CN 111682317 A 9/2020
(Continued)

*Primary Examiner* — Wei (Victor) Y Chan
(74) *Attorney, Agent, or Firm* — HOUTTEMAN LAW LLC

(57) ABSTRACT

The present disclosure provides a holographic leaky-wave antenna and an electronic apparatus, and relates to the field of communication technology. The holographic leaky-wave antenna includes a first waveguide structure, a first dielectric substrate, a radiation layer, a first reference electrode layer, and switching units. The first dielectric substrate is arranged on the first waveguide structure and there is a first gap between the first dielectric substrate and the first waveguide structure; the first reference electrode layer is arranged on a side of the first waveguide structure away from the first dielectric substrate; the radiation layer is arranged on a side of the first dielectric substrate away from the first waveguide structure, and has slit openings therein. The first waveguide structure includes at least one feeding port.

20 Claims, 14 Drawing Sheets

(58) Field of Classification Search
CPC .... H01Q 13/103; H01Q 1/38; H01Q 21/0031; H01Q 3/34; H01Q 21/20; H01Q 1/50; H01Q 13/10
See application file for complete search history.

(56) References Cited

U.S. PATENT DOCUMENTS

| | | | | |
|---|---|---|---|---|
| 2020/0083605 | A1 | 3/2020 | Quarfoth et al. | |
| 2020/0287277 | A1* | 9/2020 | Wang ........................ | H01Q 9/27 |
| 2022/0328965 | A1 | 10/2022 | Chalabi et al. | |
| 2024/0364012 | A1* | 10/2024 | Wang ........................ | H01Q 1/00 |

FOREIGN PATENT DOCUMENTS

| | | | |
|---|---|---|---|
| CN | 112688046 | A | 4/2021 |
| CN | 112909519 | A | 6/2021 |
| CN | 115579636 | A | 1/2023 |

* cited by examiner

HOLOGRAPHIC LEAKY-WAVE ANTENNA AND ELECTRONIC APPARATUS

TECHNICAL FIELD

The present disclosure relates to the field of communication technology, and in particular relates to a holographic leaky-wave antenna and an electronic apparatus.

BACKGROUND

A liquid crystal holographic electronically controlled scanning array antenna is a low-profile and low-cost antenna capable of beamforming (i.e., beamformable antenna) implemented by applying holographic control theory to a liquid crystal electronically controlled scanning antenna. The holographic technology is a technology which records amplitude information and phase information of an object by using the principles related to interference and diffraction of waves and by reproducing a three-dimensional image of the object. A holographic antenna is an application of the holographic technology in the field of microwave engineering, and can acquire a desired radiation electromagnetic wave by recording and recovering an interference field of a reference electromagnetic wave and a desired radiation electromagnetic wave. The holographic antenna generally has two parts, which are a feeding structure and a holographic structure. The feeding structure is configured to transmit a reference wave which can mutually interfere with the desired radiation electromagnetic wave, and the holographic structure is configured to record the distribution of an interference field. When the holographic antenna operates, the interference field is firstly formed on a certain plane by the reference electromagnetic wave and the desired radiation electromagnetic wave, then the distribution of the interference field is recorded by the holographic structure, and finally the holographic structure recorded with the distribution of the interference field is excited by the reference electromagnetic wave, thereby recovering (or reproducing) the desired radiation electromagnetic wave. In a case where an antenna unit has the characteristic of controllable radiation electromagnetic waves, a liquid crystal holographic electronically controlled scanning antenna can dynamically record various interference field distribution conditions, thereby recovering (or reproducing) the desired radiation electromagnetic wave and achieving beamformable properties.

SUMMARY

The present disclosure is intended to solve at least one of the technical problems existing in the prior art, and to provide a holographic leaky-wave antenna and an electronic apparatus.

In a first aspect, an embodiment of the present disclosure provides a holographic leaky-wave antenna, including a first waveguide structure, a first dielectric substrate, a radiation layer, a first reference electrode layer, and a plurality of switching units; wherein the first dielectric substrate is arranged on the first waveguide structure and has a first gap with the first waveguide structure; the first reference electrode layer is arranged on a side of the first waveguide structure away from the first dielectric substrate; the radiation layer is arranged on a side of the first dielectric substrate away from the first waveguide structure, and has a plurality of slit openings therein; and the first waveguide structure includes at least one feeding port, and an orthographic projection of the at least one feeding port on the first dielectric substrate does not overlap with an orthographic projection of the first reference electrode layer on the first dielectric substrate; the plurality of switching units are in one-to-one correspondence with the plurality of slit openings, and are configured to independently control switching states of the corresponding slit openings.

In an embodiment, each switching unit includes a second dielectric substrate opposite to the first dielectric substrate, a tunable dielectric layer between the second dielectric substrate and the radiation layer, and a patch electrode on a side of the second dielectric substrate close to the tunable dielectric layer, and wherein an orthographic projection of the patch electrode on the second dielectric substrate at least partially overlaps with an orthographic projection of the corresponding slit opening on the second dielectric substrate.

In an embodiment, the plurality of slit openings include a plurality of first groups of slit openings arranged side by side in a second direction, and the slit openings of each first group of slit openings are arranged side by side in a first direction; the plurality of switching units include a plurality of first groups of switching units arranged side by side in the second direction, and the switching units of each first group of switching units are arranged side by side in the first direction; and patch electrodes of every two adjacent first groups of switching units define a first region therebetween, the holographic leaky-wave antenna further includes a group of first bias voltage lines arranged in each first region and on the second dielectric substrate, and first bias voltage lines of the group of first bias voltage lines are connected to the patch electrodes of the corresponding first group of switching units in one-to-one correspondence.

In an embodiment, the holographic leaky-wave antenna further includes a plurality of first connection pads on the second dielectric substrate, each first bias voltage line is connected to one corresponding first connection pad through one corresponding first fan-out trace.

In an embodiment, the plurality of slit openings include a plurality of first groups of slit openings arranged side by side in a second direction and a plurality of second groups of slit openings arranged side by side in a first direction, the slit openings of each first group of slit openings are arranged side by side in the first direction, the slit openings of each second group of slit openings are arranged side by side in the second direction; the plurality of switching units include a plurality of first groups of switching units arranged side by side in the second direction and a plurality of second groups of switching units arranged side by side in the first direction, the switching units of each first group of switching units are arranged side by side in the first direction, and the switching units of each second group of switching units are arranged side by side in the second direction; and each switching unit further includes a switching transistor on the second dielectric substrate, a second electrode of the switching transistor in each switching unit is connected to the patch electrode, control electrodes of the switching transistors in each first group of switching units are connected to a same control signal line, and first electrodes of the switching transistors in each second group of switching units are connected to a same first bias voltage line.

In an embodiment, the holographic leaky-wave antenna further includes a plurality of first connection pads and a plurality of second connection pads on the second dielectric substrate, each first bias voltage line is connected to one corresponding first connection pad through one corresponding first fan-out trace, and each control signal line is connected to one corresponding second connection pad through one corresponding second fan-out trace.

In an embodiment, each switching unit includes a PIN diode on the first dielectric substrate and at a position corresponding to the slit opening.

In an embodiment, the plurality of slit openings include a plurality of first groups of slit openings arranged side by side in a second direction, and the slit openings of each first group of slit openings are arranged side by side in a first direction; the plurality of switching units include a plurality of first groups of switching units arranged side by side in the second direction, and the switching units of each first group of switching units are arranged side by side in the first direction; patch electrodes of every two adjacent first groups of switching units define a first region therebetween, the holographic leaky-wave antenna further includes a group of first bias voltage lines arranged in each first region and on the second dielectric substrate, and first bias voltage lines of the group of first bias voltage lines are connected to first electrodes of the PIN diodes of the corresponding first group of switching units in one-to-one correspondence; and second electrodes of the PIN diodes of each first group of switching units is connected to a corresponding reference voltage line, and the reference voltage lines are connected together to a signal output line.

In an embodiment, the holographic leaky-wave antenna further includes a plurality of first connection pads and a third connection pad on the first dielectric substrate, each first bias voltage line is connected to one corresponding first connection pad through one corresponding first fan-out trace, and the signal output line is connected to the third connection pad.

In an embodiment, the plurality of slit openings include a plurality of first groups of slit openings arranged side by side in a second direction and a plurality of second groups of slit openings arranged side by side in a first direction, the slit openings of each first group of slit openings are arranged side by side in the first direction, the slit openings of each second group of slit openings are arranged side by side in the second direction; the plurality of switching units include a plurality of first groups of switching units arranged side by side in the second direction and a plurality of second groups of switching units arranged side by side in the first direction, the switching units of each first group of switching units are arranged side by side in the first direction, and the switching units of each second group of switching units are arranged side by side in the second direction; and each switching unit further includes a switching transistor on the second dielectric substrate, a second electrode of the switching transistor in each switching unit is connected to a first electrode of the PIN diode, control electrodes of the switching transistors in each first group of switching units are connected to a same control signal line, first electrodes of the switching transistors in each second group of switching units are connected to a same first bias voltage line, second electrodes of the PIN diodes of each first group of switching units is connected to a corresponding reference voltage line, and the reference voltage lines are connected together to a signal output line.

In an embodiment, the holographic leaky-wave antenna further includes a plurality of first connection pads, a plurality of second connection pads, and a third connection pad on the second dielectric substrate, each first bias voltage line is connected to one corresponding first connection pad through one corresponding first fan-out trace, each control signal line is connected to one corresponding second connection pad through one corresponding second fan-out trace, and the signal output line is connected to the third connection pad.

In an embodiment, a width of each of two opposite ends of each slit opening is not less than a width of a middle portion of the slit opening.

In an embodiment, the holographic leaky-wave antenna further includes a feeding structure configured to excite a microwave signal through a plurality of feeding ports.

In an embodiment, the feeding structure includes a plurality of coaxial probes, and each coaxial probe is arranged at a location corresponding to one feeding port.

In an embodiment, the feeding structure further includes a butler network matrix board electrically connected to the plurality of coaxial probes.

In an embodiment, the plurality of feeding ports include four feeding ports which are a first feeding port, a second feeding port, a third feeding port, and a fourth feeding port, a connection line between a center of the first feeding port and a center of the second feeding port is a first line segment, a connection line between a center of the third feeding port and a center of the fourth feeding port is a second line segment, and the first line segment and the second line segment are perpendicular to each other.

In an embodiment, the center of first feeding port, the center of the second feeding port, the center of the third feeding port and the center of the fourth feeding port each have a same distance, which is a first distance, from a center of the first waveguide structure.

In an embodiment, the first distance ranges from 3 mm to 8 mm.

In an embodiment, the holographic leaky-wave antenna further includes a wave absorbing material attached to the periphery of the first waveguide structure.

In an embodiment, the radiation layer includes at least two slit openings extending in different directions.

In an embodiment, the holographic leaky-wave antenna further includes a second waveguide structure on a side of the radiation layer close to the first waveguide structure, and a second reference electrode layer on a side of the second waveguide structure close to the first waveguide structure.

In an embodiment, the holographic leaky-wave antenna further includes an absorbing load disposed in the second waveguide structure.

In a second aspect, an embodiment of the present disclosure provides an electronic apparatus, which includes the holographic leaky-wave antenna according to any one of the embodiments of the first aspect.

DETAIL DESCRIPTION OF EMBODIMENTS

To make technical solutions of the present disclosure be better understood by one of ordinary skill in the art, the present disclosure will be further described below in detail with reference to the accompanying drawings and exemplary embodiments.

Unless defined otherwise, technical or scientific terms used herein shall have the ordinary meaning as understood by one of ordinary skill in the art to which this disclosure belongs. The terms "first", "second", and the like used in this disclosure are not intended to indicate any order, quantity, or importance, but rather are used for distinguishing one element from another. Further, the term "a", "an", "the", or the like does not denote a limitation of quantity, but rather denotes the presence of at least one. The term "comprising", "including", or the like means that the element or item preceding the term contains the element or item listed after the term and its equivalent, but does not exclude the presence of other elements or items. The term "connected", "coupled", or the like is not limited to physical or mechanical connections, but may include electrical connections, whether direct or indirect. The terms "upper", "lower", "left", "right", and the like are used only for indicating relative positional relationships, and when an absolute position of an object being described is changed, the relative positional relationships may also be changed accordingly.

Figure 1:
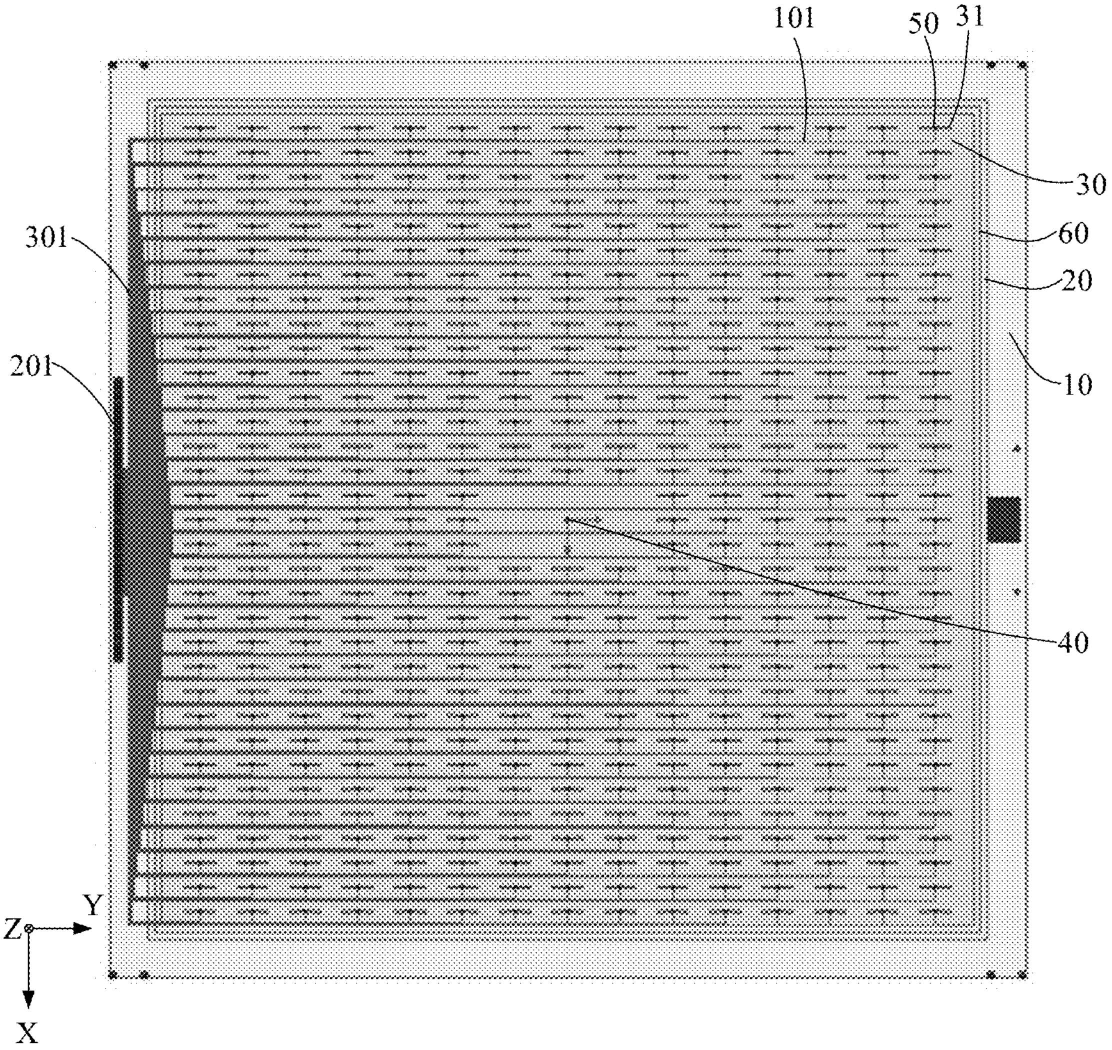
FIG. 1 is a top view of a holographic leaky-wave antenna according to an embodiment of the present disclosure.
Figure 2:
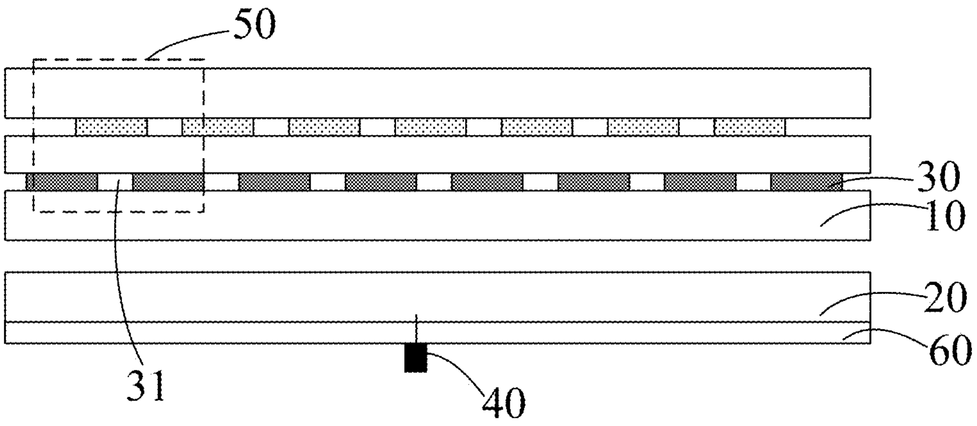
FIG. 2 is a schematic cross-sectional view of a holographic leaky-wave antenna according to an embodiment of the present disclosure.

In a first aspect, FIG. 1 is a top view of a holographic leaky-wave antenna according to an embodiment of the present disclosure. FIG. 2 is a schematic cross-sectional view of a holographic leaky-wave antenna according to an embodiment of the present disclosure. As shown in FIGS. 1 and 2, the present disclosure provides a holographic leaky-wave antenna, including a first waveguide structure 20, a first dielectric substrate 10, a radiation layer 30, a first reference electrode layer 60, and a plurality of switching units 50. The first reference electrode layer 60 is arranged on a side of the first waveguide structure 20 away from the first dielectric substrate 10, the first dielectric substrate 10 is arranged on the first waveguide structure 20 and has a first gap with the first waveguide structure 20, the radiation layer is arranged on a side of the first dielectric substrate 10 away from the first waveguide structure 20, and has a plurality of slit openings 31 therein. The switching units 50 are disposed in one-to-one correspondence with the slit openings 31 in the radiation layer 30, and are configured to independently control switching states of the corresponding slit openings 31. That is, the switching units 50 may control whether the slit openings 31 of the radiation layer 30 can radiate electromagnetic waves transmitted by the first waveguide structure 20. A hologram antenna in the embodiment of the present disclosure includes at least one feeding port, and an orthographic projection of the feeding port on the first dielectric substrate 10 does not overlap with an orthographic projection of the first reference electrode layer 60 on the first dielectric substrate 10. It should be understood that the holographic leaky-wave antenna in the embodiment of the present disclosure includes not only the structure, but also a feeding structure configured to feed an electromagnetic wave into the feeding port of the first waveguide structure 20. The feeding structure includes, but is not limited to, a probe 40. In the embodiment of the present disclosure, as an example, the feeding structure includes at least a coaxial probe 40.

In the holographic leaky-wave antenna in the embodiment of the present disclosure, the switching units 50 corresponding to the slit openings 31 of the radiation layer 30 are controlled individually, so that in the holographic antenna in the embodiment of the present disclosure, a holographic topological structure can be obtained according to a holographic algorithm. In this way, by controlling the switching states of the switching units 50, the holographic topological array replication can be achieved, a target beam can be obtained, and thus, the spatial two-dimensional beam scanning characteristic can be achieved.

In some examples, the first waveguide structure 20 in the embodiment of the present disclosure includes a plurality of feeding ports, and an orthogonal projection of each of the plurality of feeding ports on the first dielectric substrate 10 does not overlap with an orthogonal projection of the first reference electrode layer 60 on the first dielectric substrate 10. That is, in the present embodiment, multi-point feeding is adopted, and compared with single-point feeding, the multi-point feeding can achieve better radiation without a wave absorbing material, and has better anti-echo interference capability.

Figure 3:
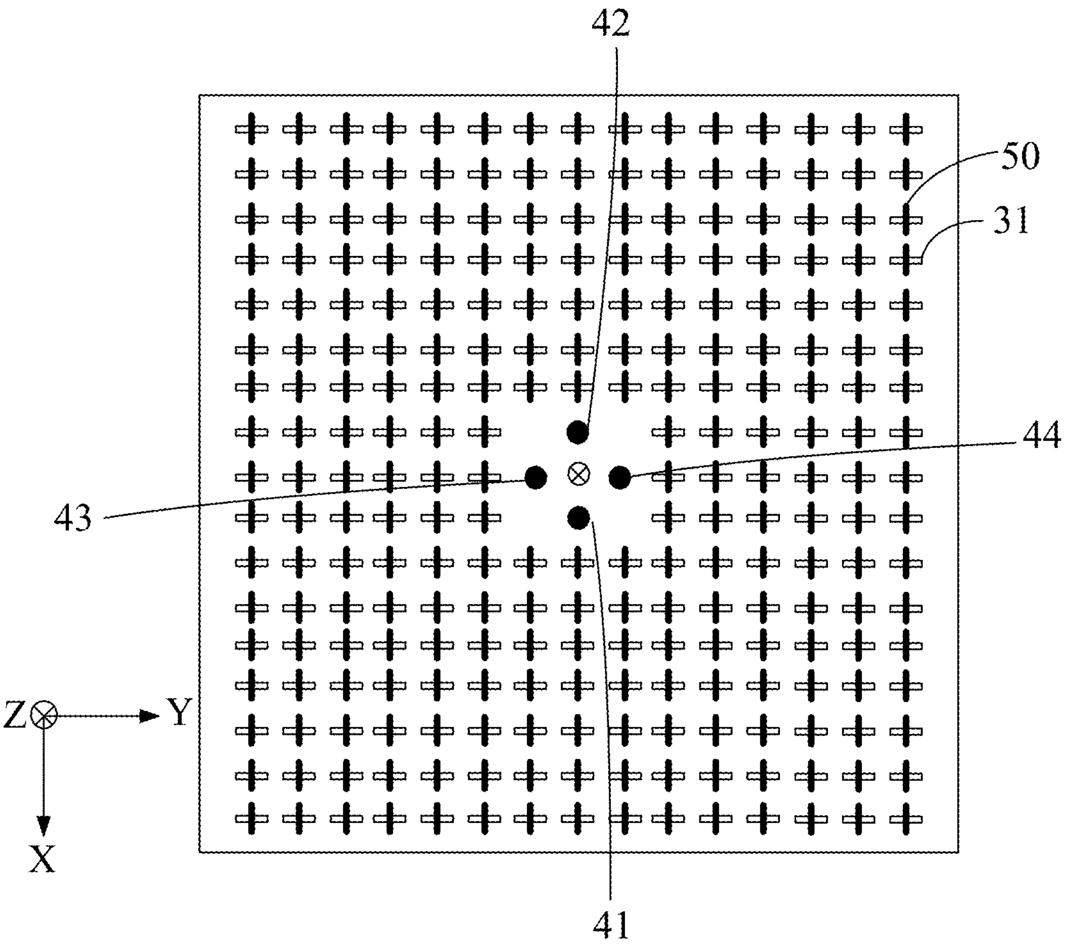
FIG. 3 is a top view of a four-point feeding holographic leaky-wave antenna according to an embodiment of the present disclosure.

FIG. 3 is a top view of a four-point feeding holographic leaky-wave antenna according to an embodiment of the present disclosure. It should be noted that as shown in FIG. 3, in the following examples of the present disclosure, an example is taken in which the holographic leaky-wave antenna includes only four feeding ports, i.e., the holographic leaky-wave antenna operates in a mode of four-point feeding, and for convenience of description, the four feeding ports are respectively referred to as a first feeding port 41, a second feeding port 42, a third feeding port 43, and a fourth feeding port 44. However, the holographic leaky-wave antenna according to the present embodiment is not limited to adopting the four-point feeding, and may be any integer which is greater than 1 and divides 360 exactly (i.e., divides 360 with a remainder of zero), for example, three-point feeding, six-point feeding, or the like may alternatively be adopted. In an embodiment of the present disclosure, the four-point feeding is adopted, so that the control of the holographic leaky-wave antenna can be more flexible. Further, by exciting phases of different amplitude with the probes 40, various different directional patterns of radiation of the antenna can be acquired, so that the antenna can be applied to different scenes more flexibly. For example, a schematic directional pattern of a middle depression of an equal-amplitude 90° phase-difference feeding can be achieved by the holographic leaky-wave antenna according to an embodiment of the present disclosure. For example, the directional pattern of the middle depression can be acquired by performing the equal-amplitude 90° phase-difference feeding on the four-point feeding.

Further, referring to FIG. 3, the holographic leaky-wave antenna is an X-directional linearly polarized antenna, a connection line between a center of the first feeding port 41 and a center of the second feeding port 42 is a first line segment, a connection line between a center of the third feeding port 43 and a center of the fourth feeding port 44 is a second line segment, and the first line segment and the second line segment are perpendicular to each other. The center of first feeding port 41, the center of the second feeding port 42, the center of the third feeding port 43 and the center of the fourth feeding port 44 each have a same distance (i.e., an identical distance), which is a first distance, from a center of the first waveguide structure 20. The first distance ranges from 3 mm to 8 mm. In some examples, the first waveguide structure 20 according to the present embodiment includes a slow-wave dielectric layer. For example, the first waveguide structure 20 includes a waveguide cavity, and a low-loss polymer material may be filled in the waveguide cavity to serve as the slow-wave dielectric layer, so as to achieve the effect of slow-wave waveguide.

Further, the first gap between the first waveguide structure 20 and the first dielectric substrate 10 may be an air gap. That is, the air gap is formed between the first dielectric substrate 10 and the slow-wave dielectric layer. In order to form the air gap between the first dielectric substrate 10 and the slow-wave dielectric layer, a supporting member may be disposed between the first dielectric substrate 10 and the slow-wave dielectric layer, and both ends of the supporting member abut against the first dielectric substrate 10 and the slow-wave dielectric layer, respectively. In some examples, the supporting member may be a nylon pillar or the like.

In some examples, extending directions of the slit openings 31 in the radiation layer 30 are the same. It should be noted that an extending direction of each slit opening 31 refers to a direction of a long side of an orthographic projection of the slit opening 31 on the first dielectric substrate 10. For example, each slit opening 31 extends along the first direction Y, and the switching state of each slit opening 31 is controlled by controlling the corresponding switching unit 50, thereby realizing a linearly polarized antenna in a second direction X. For example, each slit opening 31 extends along the second direction X, and the switching state of each slit opening 31 is controlled by controlling the corresponding switching unit 50, thereby realizing a linearly polarized antenna in the first direction Y. It should be noted that in the embodiment of the present disclosure, as an example, the first direction Y and the second direction X are perpendicular to each other. For example: the first direction Y is a horizontal direction, and the second direction X is a vertical direction.

Figure 4:
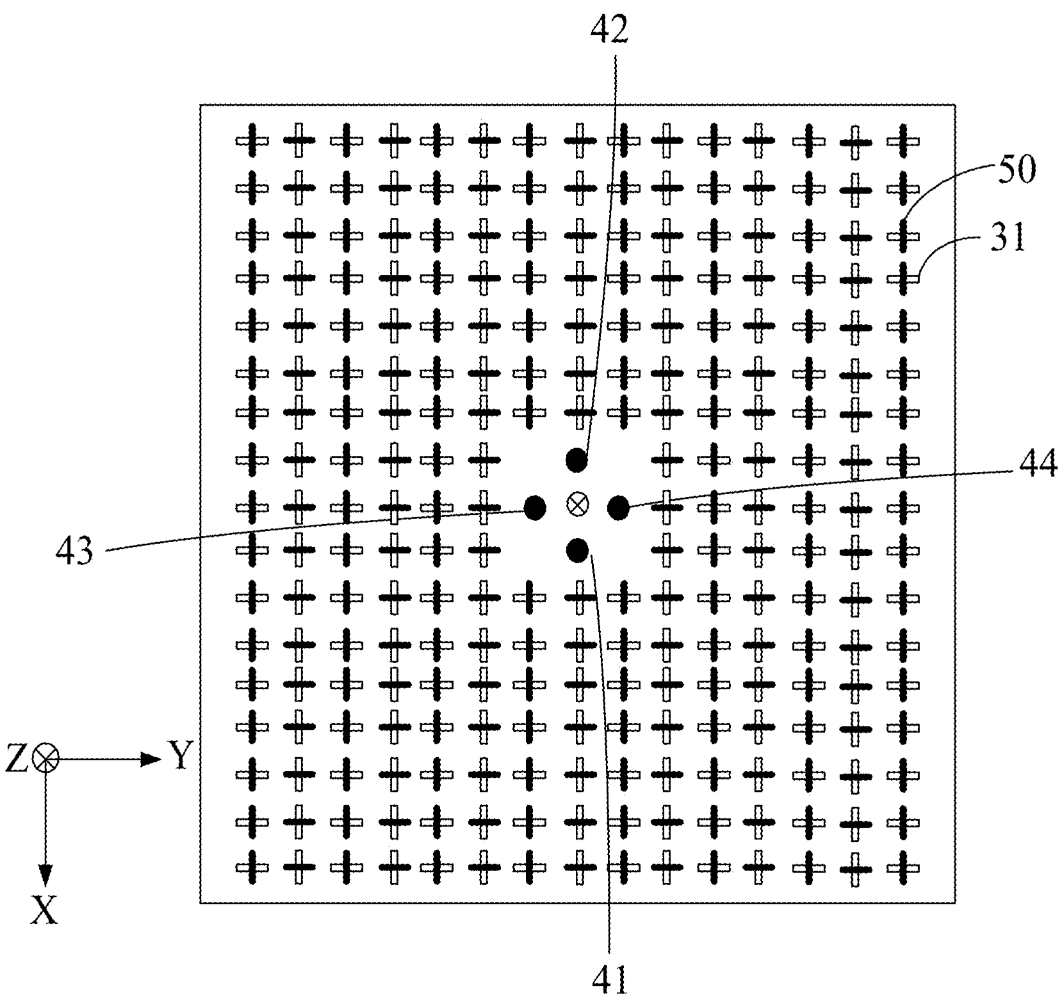
FIG. 4 is a top view of another four-point feeding holographic leaky-wave antenna according to an embodiment of the present disclosure.
Figure 5:
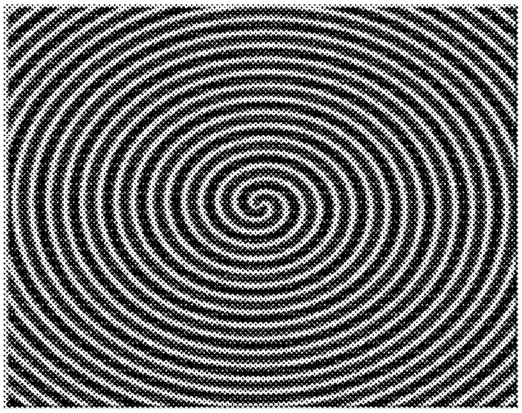
FIG. 5 is an ideal topological diagram of left-handed circular polarization realized by the holographic leaky-wave antenna of FIG. 4.
Figure 6:
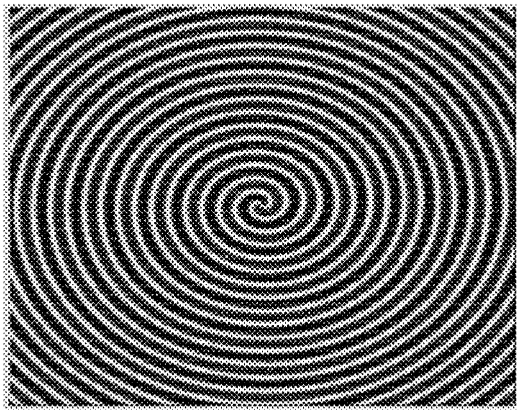
FIG. 6 is an ideal topology diagram of right-handed circular polarization realized by the holographic leaky-wave antenna of FIG. 4.

FIG. 4 is a top view of another four-point feeding holographic leaky-wave antenna according to an embodiment of the present disclosure. In some examples, as shown in FIG. 4, the radiation layer 30 at least includes slit openings 31 extending in two directions. For example, the radiation layer 30 includes slit openings 31 extending in two directions, namely, the slit openings 31 extending in the first direction Y and the slit openings 31 extending in the second direction X. At this time, the switching units 50 corresponding to the slit openings 31 extending in the second direction X are controlled so that the slit openings 31 extending in the second direction X are all in an off state, and then the switching units 50 corresponding to the slit openings 31 extending in the first direction Y are controlled by the holographic algorithm so as to control the switching states of the slit openings 31 extending in the first direction Y, thereby realizing the linearly polarized antenna in the second direction X. Similarly, the switching units 50 corresponding to the slit openings 31 extending along the first direction Y are controlled so that the slit openings 31 extending along the first direction Y are in the off state, and then the switching units 50 corresponding to the slit openings 31 extending along the second direction X are controlled by the holographic algorithm to control the switching states of the slit openings 31 extending along the second direction X, thereby realizing the linearly polarized antenna in the first direction Y. Alternatively, it is also possible to select a slit opening pair or a pair of slit openings (the slit opening pair is composed of one slit opening 31 extending along the first direction Y and one slit opening 31 extending along the second direction X) according to a holographic topology, and a left-handed circular polarization antenna or a right-handed circular polarization antenna can be realized by controlling switching states of the slit opening pair, as shown in FIGS. 5 and 6. FIG. 5 is an ideal topological diagram of left-handed circular polarization realized by the holographic leaky-wave antenna of FIG. 4. FIG. 6 is an ideal topology diagram of right-handed circular polarization realized by the holographic leaky-wave antenna of FIG. 4.

As shown in FIG. 4, only the slit openings 31 in the radiation layer 30 are shown to include the slit openings 31 extending in the first direction Y and the second direction X, and alternately arranged in the first direction Y. Alternatively, the extending directions of the slit openings 31 are not limited to the first direction Y and the second direction X, and the radiation layer 30 is not limited to including the slit openings 31 extending in two directions, and the slit openings 31 may be arranged in a rotated manner or in an angled manner, which is not enumerated herein.

In some examples, no slit opening 31 is provided in the middle of the radiation layer 30, to avoid excitation of higher order modes.

Figure 7:
FIG. 7 is a schematic diagram illustrating a correspondence between switching units and slit openings of a holographic leaky-wave antenna according to an embodiment of the present disclosure.

FIG. 7 is a schematic diagram illustrating a correspondence between switching units 50 and slit openings 31 of a holographic leaky-wave antenna according to an embodiment of the present disclosure. In some examples, as shown in FIG. 7, each switching unit 50 in the embodiment of the present disclosure may be a PIN diode or a variable reactance diode (e.g., a varactor). In this case, the PIN diode or the variable reactance diode (e.g., the varactor) may be integrated with the corresponding slit opening 31, thereby achieving a regulation capability of binary amplitude or continuous amplitude. For example, taking the example that each switching unit 50 is the PIN diode, the input of a bias voltage to the PIN diode is controlled, thereby controlling the forward/reverse bias of the PIN diode. When a slit opening 31 is required to be in an open state, the bias voltage input to the corresponding PIN diode is greater than a turn-on threshold value of the corresponding PIN diode, and the corresponding PIN diode is turned on. When the slit opening 31 is required to be in a closed state, the corresponding PIN diode is input with a bias voltage smaller than its turn-on threshold value, and the corresponding PIN diode is turned off.

Figure 8:
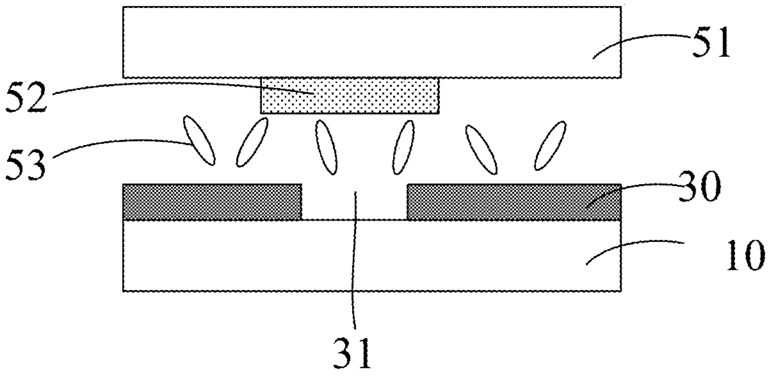
FIG. 8 is a schematic diagram illustrating another correspondence between switching units and slit openings of a holographic leaky-wave antenna according to an embodiment of the present disclosure.

FIG. 8 is a schematic diagram illustrating another correspondence between switching units 50 and slit openings 31 of a holographic leaky-wave antenna according to an embodiment of the present disclosure. In some examples, as shown in FIG. 8, each switching unit 50 is a liquid crystal switch. Specifically, a second dielectric substrate 51 is disposed opposite to the first dielectric substrate 10, a patch electrode 52 is disposed on the second dielectric substrate 51, and a tunable dielectric layer, such as a liquid crystal layer 53, is disposed between a layer, where the patch electrode 52 on the second dielectric substrate 51 is located, and the radiation layer 30. By changing a voltage applied to the patch electrode 52, a rotation angle of liquid crystal molecules of the liquid crystal layer 53 is changed, thereby realizing continuous control of an amplitude of a radio frequency signal radiated from the slit opening 31.

Figure 9:
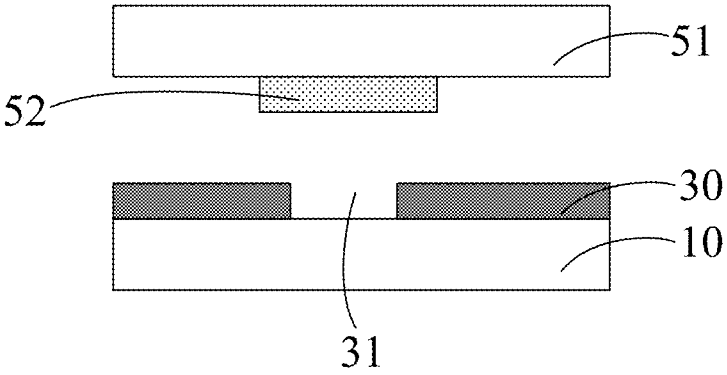
FIG. 9 is a schematic diagram illustrating another correspondence between switching units and slit openings of a holographic leaky-wave antenna according to an embodiment of the present disclosure.

FIG. 9 is a schematic diagram illustrating another correspondence between switching units 50 and slit openings 31 of a holographic leaky-wave antenna according to an embodiment of the present disclosure. In some examples, as shown in FIG. 9, each switching unit 50 is a MEMS switch. For example, a second dielectric substrate 51 is arranged opposite to the first dielectric substrate 10, and the second dielectric substrate 51 is a flexible substrate. Patch electrodes 52 are arranged on the second dielectric substrate 51, and are in one-to-one correspondence with the slit openings 31. In this case, by applying a voltage to the patch electrodes 52, a distance between each patch electrode 52 and the corresponding slit opening 31 is adjusted under the action of an electric field force, so that a radiation amplitude of a radio frequency signal is continuously adjusted and controlled. The hologram antenna in the embodiment of the present disclosure will be described by only taking an example where each switching unit 50 employs the liquid crystal switch or the PIN diode.

Figure 10:
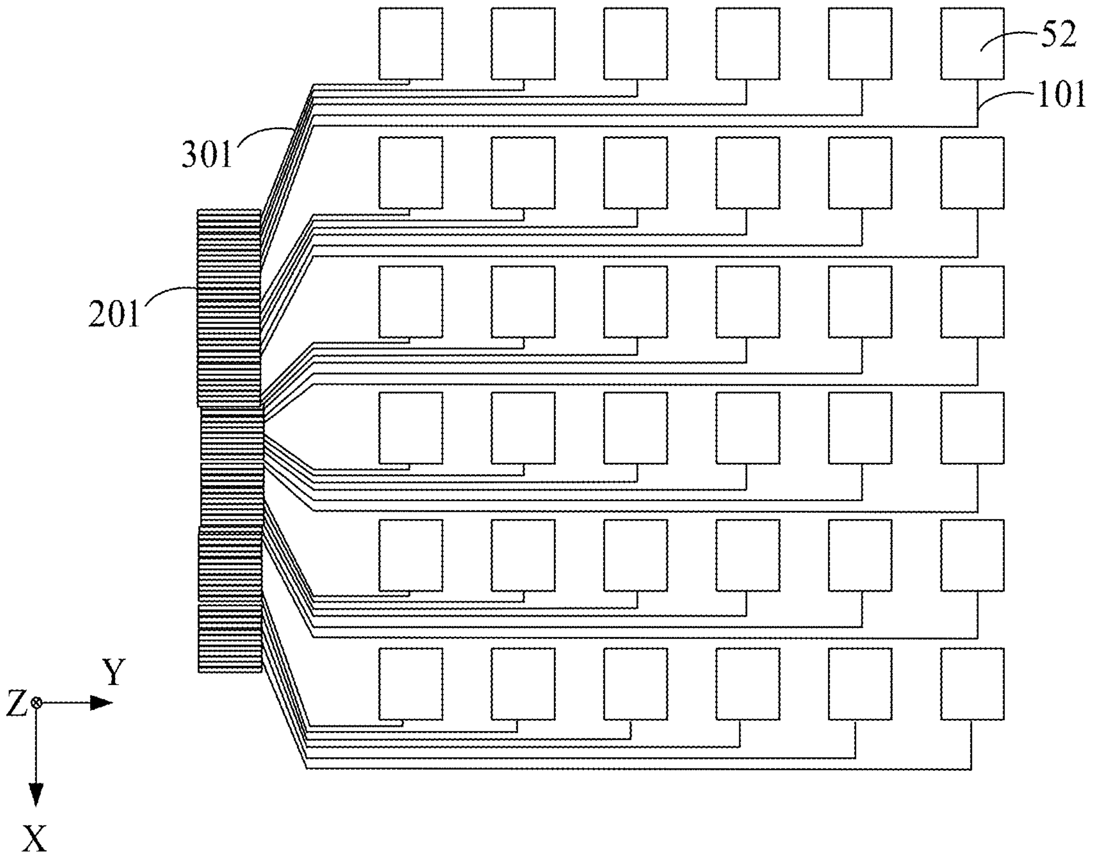
FIG. 10 is a schematic diagram illustrating a first example of a wiring of a holographic leaky-wave antenna according to an embodiment of the present disclosure.

In a first example, each switching unit 50 employs a liquid crystal switch. FIG. 10 is a schematic diagram illustrating a first example of a wiring of a holographic leaky-wave antenna according to an embodiment of the present disclosure. Referring to FIG. 10, the slit openings 31 in the radiation layer 30 are divided into a plurality of first groups of slit openings 31 arranged side by side in the second direction X, and the slit openings 31 of each first group of slit openings 31 are arranged side by side in the first direction Y. The switching units 50 are divided into first groups of switching units 50 arranged side by side in the second direction X, and the switching units 50 of each first group of switching units 50 are arranged side by side in the first direction Y. A first region is defined between every two adjacent first groups of slit openings 31, each first region is provided with a group of first bias voltage lines 101 arranged on the second dielectric substrate 51, and electrically connected to the patch electrodes 52 of the liquid crystal switches in the corresponding first group of the switching units 50. In this way, the liquid crystal switches can be independently controlled, and the wiring is convenient.

Further, the first bias voltage lines 101 may be disposed on a layer, where the patch electrodes 52 are located, close to the second dielectric substrate 51, and therefore, the first bias voltage lines 101 may be made of ITO (indium tin oxide). Alternatively, the first bias voltage lines 101 may be made of a metal material.

In some examples, a plurality of first connection pads 201 are further disposed on the second dielectric substrate 51, and are disposed in one-to-one correspondence with the first bias voltage lines 101, and the first bias voltage lines 101 may be electrically connected to the corresponding first connection pads 201 through corresponding first fan-out traces 301. In this way, a driving chip is bonded and connected to the first connection pads 201, so that the signal loading on the first bias voltage lines 101 may be achieved.

In a second example, the plurality of slit openings 31 include the plurality of first groups of slit openings 31 arranged side by side in the second direction X, and the plurality of second groups of slit openings 31 arranged side by side in the first direction Y, the slit openings 31 in each first group of slit openings 31 are arranged side by side in the first direction Y, the slit openings 31 in each second group of slit openings 31 are arranged side by side in the second direction X. The plurality of switching units 50 include a plurality of first groups of switching units 50 arranged side by side in the second direction X, and a plurality of second groups of switching units 50 arranged side by side in the first direction Y, the switching units 50 in each first groups of switching units 50 are arranged side by side in the first direction Y, the switching units 50 in each second groups of switching units 50 are arranged side by side in the second direction X.

Figure 11:
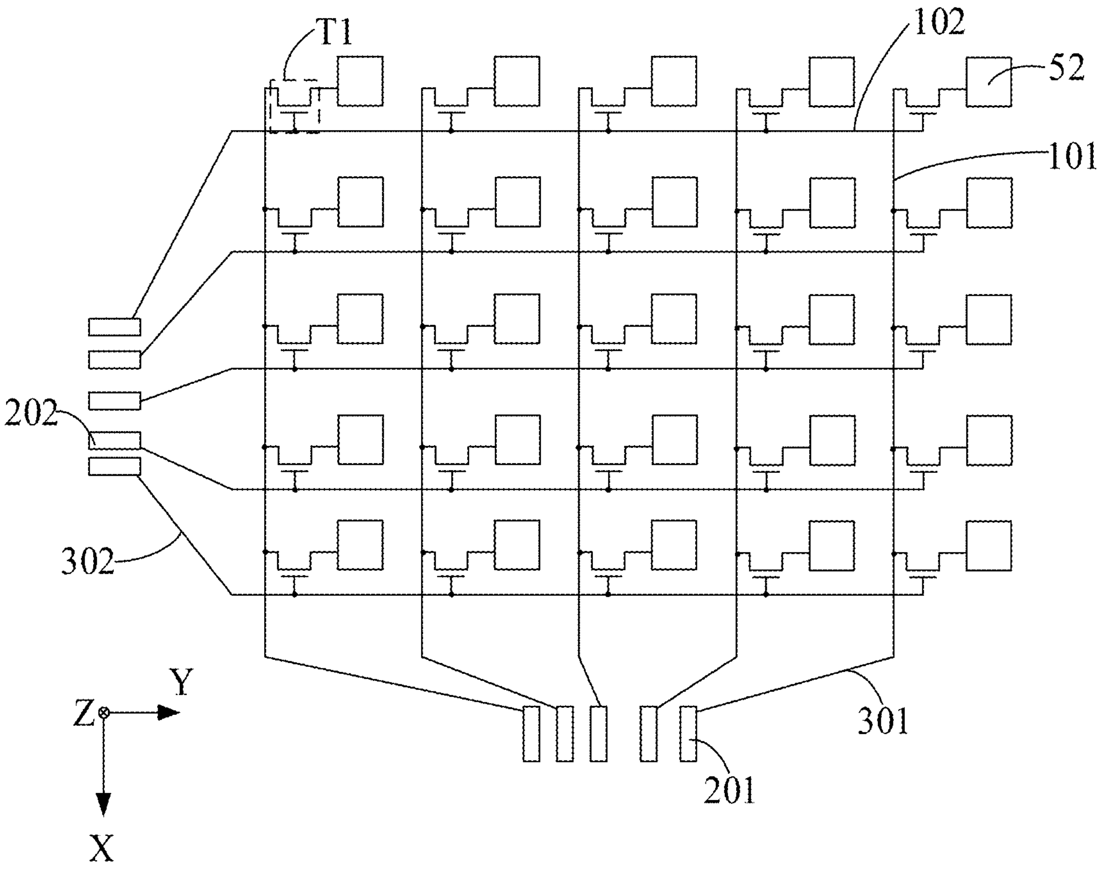
FIG. 11 is a schematic diagram illustrating a second example of a wiring of a holographic leaky-wave antenna according to an embodiment of the present disclosure.

FIG. 11 is a schematic diagram illustrating a second example of a wiring of a holographic leaky-wave antenna according to an embodiment of the present disclosure. As shown in FIG. 11, in this example, each switching unit 50 includes the liquid crystal switch as in the first example, but each switching unit 50 further includes a switching transistor T1. A second electrode of the switching transistor T1 is electrically connected to the patch electrode 52 of the corresponding liquid crystal switch. Control electrodes of the switching transistors T1 in each first group of switching units 50 are connected to a same control signal line 102, and first electrodes of the switching transistors T1 in each second group of switching units 50 are connected to a same first bias voltage line 101. By controlling the switching states of the switching transistors T1, a first bias voltage written to the patch electrode 52 in each switching unit 50 can be controlled, thereby controlling the switching state of each switching unit 50. In this example, only one control signal line 102 is required by each first group of switching units 50 to control, and only one first bias voltage line 101 is required by each second group of switching units 50 to provide the first bias voltage, so that the wiring can be greatly reduced. Further, the switching transistors T1 are disposed on the second dielectric substrate 51, and both the first bias signal lines and the patch electrodes 52 may be disposed in the same layer as the first electrodes and the second electrodes of the switching transistors T1, and the control signal lines 102 may be disposed in the same layer as the control electrodes of the switching transistors T1, which is favorable for the lightweight and thinness of the antenna.

In some examples, a plurality of first connection pads 201 and a plurality of second connection pads 202 are further disposed on the second dielectric substrate 51, each first bias voltage line 101 is connected to one corresponding first connection pad 201 through one corresponding first fan-out trace 301, and each control signal line 102 is connected to one corresponding second connection pad 202 through one corresponding second fan-out trace 302. In this way, a driving chip is bonded and connected to the first connection pads 201 and the second connection pads 202, so as to provide the first bias voltage to the first bias voltage lines 101 and provide the control signal to the control signal lines 102.

Figure 12:
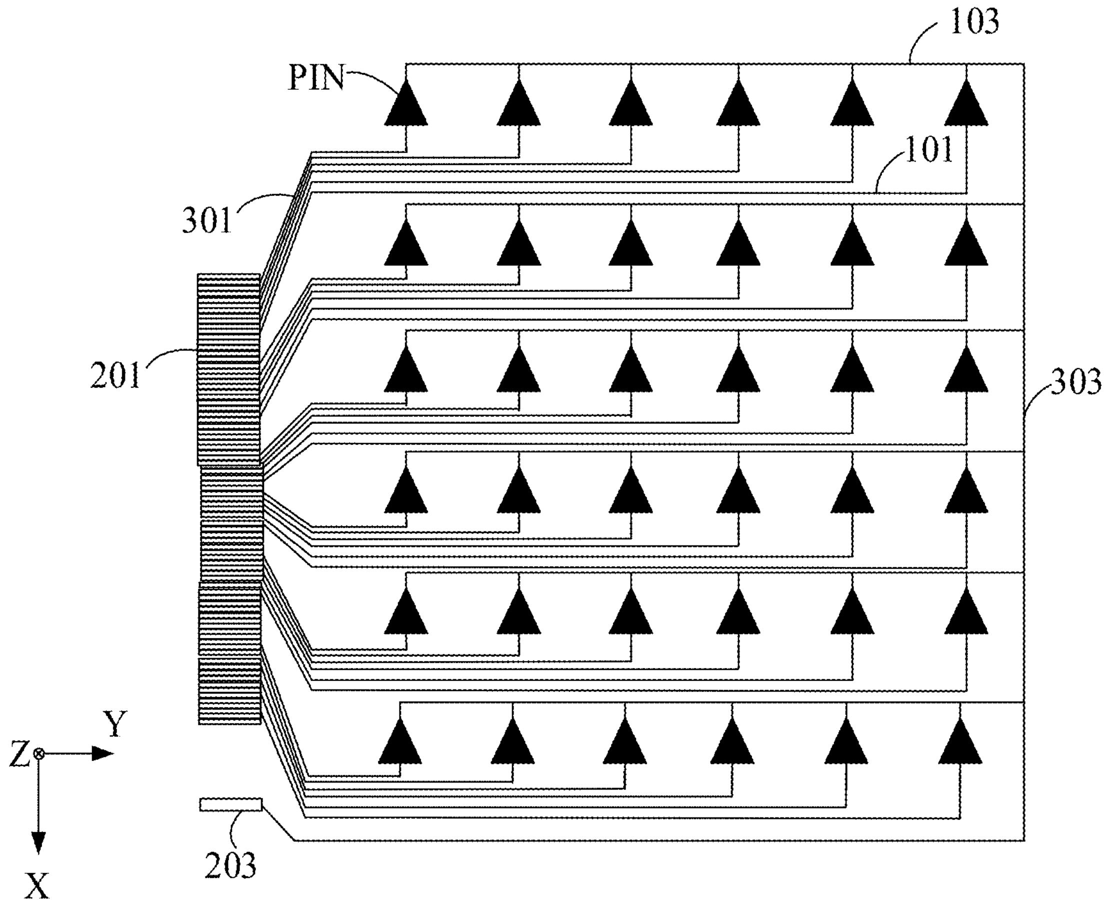
FIG. 12 is a schematic diagram illustrating a third example of a wiring of a holographic leaky-wave antenna according to an embodiment of the present disclosure.

In a third example, each switching unit 50 employs a PIN diode integrated at a position of the first dielectric substrate 10 corresponding to the slit opening 31. FIG. 12 is a schematic diagram illustrating a third example of a wiring of a holographic leaky-wave antenna according to an embodiment of the present disclosure. Referring to FIG. 12, the slit openings 31 in the radiation layer 30 are divided into a plurality of first groups of slit openings 31 arranged side by side in the second direction X, and the slit openings 31 of each first group of slit openings 31 are arranged side by side in the first direction Y. The PIN diodes are divided into first groups of switching units 50 arranged side by side in the second direction X, and the PIN diodes of each first group of switching units 50 are arranged side by side in the first direction Y. A first region is defined between every two adjacent first groups of slit openings 31, each first region is provided with a group of first bias voltage lines 101 arranged on the second dielectric substrate 51, and electrically connected to first electrodes of the PIN diodes in the corresponding first group of the switching units 50. Each first region is further provided with a reference voltage line 103, second electrodes of the PIN diodes of each group of first switching units 50 are connected to a corresponding reference voltage line 103, and the reference voltage lines 103 are connected together to a signal output line 303. In this way, the PIN diodes can be independently controlled, and the wiring is convenient.

Further, a plurality of first connection pads 201 and a third connection pad 203 are further disposed on the first dielectric substrate 10, each first bias voltage line 101 is connected to one corresponding first connection pad 201 through one corresponding first fan-out trace 301, and the signal output line 303 is connected to the third connection pad 203. In this way, a driving chip is bonded and connected to the first connection pads 201 and the third connection pad 203, so as to provide the first bias voltage to the first bias voltage lines 101 and provide a reference voltage signal to the reference voltage lines 103. It should be noted that a signal loaded on the reference voltage lines 103 may be a ground signal.

In a fourth example, the plurality of slit openings 31 include the plurality of first groups of slit openings 31 arranged side by side in the second direction X, and the plurality of second groups of slit openings 31 arranged side by side in the first direction Y, the slit openings 31 in each first group of slit openings 31 are arranged side by side in the first direction Y, the slit openings 31 in each second group of slit openings 31 are arranged side by side in the second direction X. The plurality of switching units 50 include a plurality of first groups of switching units 50 arranged side by side in the second direction X, and a plurality of second groups of switching units 50 arranged side by side in the first direction Y, the switching units 50 in each first groups of switching units 50 are arranged side by side in the first direction Y, the switching units 50 in each second groups of switching units 50 are arranged side by side in the second direction X.

Figure 13:
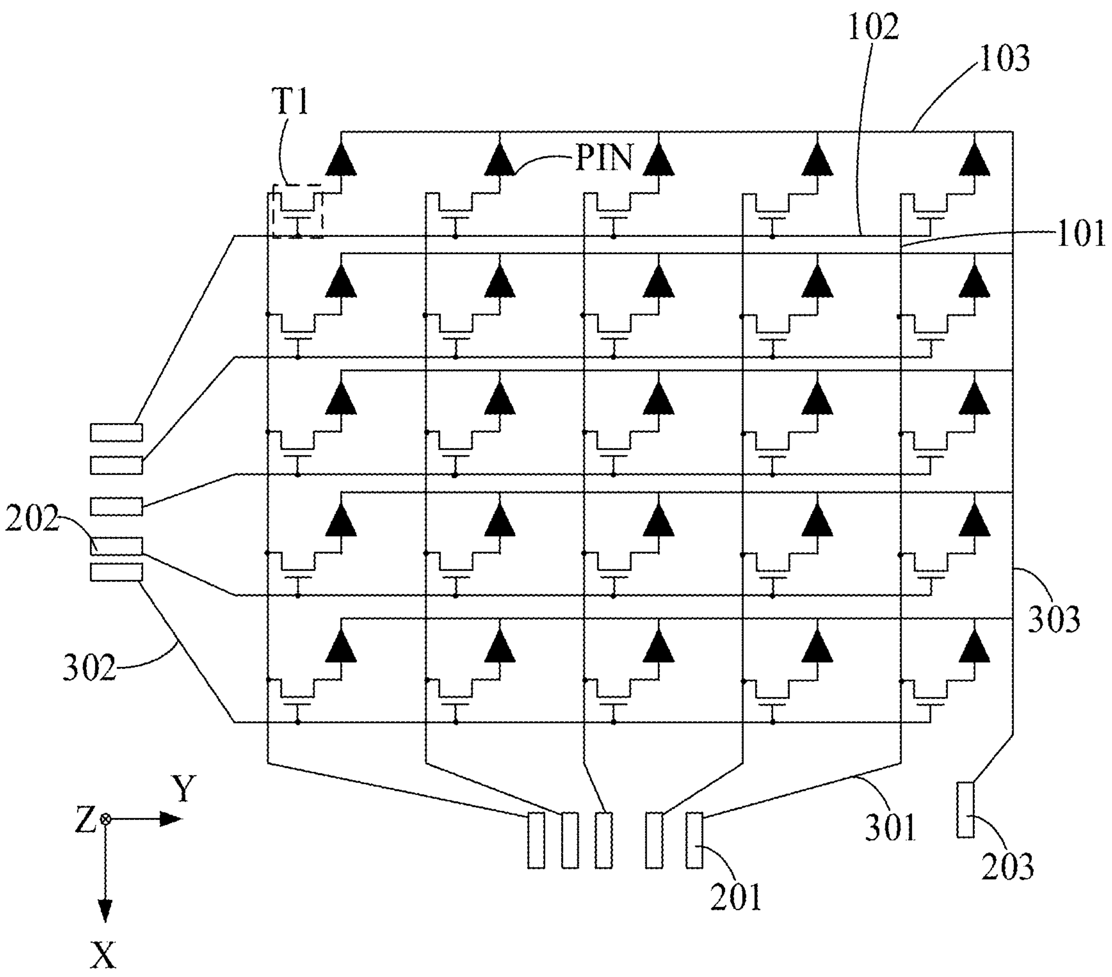
FIG. 13 is a schematic diagram illustrating a fourth example of a wiring of a holographic leaky-wave antenna according to an embodiment of the present disclosure.

FIG. 13 is a schematic diagram illustrating a fourth example of a wiring of a holographic leaky-wave antenna according to an embodiment of the present disclosure. As shown in FIG. 13, in this example, each switching unit 50 includes the PIN diode as in the first example, but each switching unit 50 further includes a switching transistor T1. A second electrode of the switching transistor T1 in each switching unit 50 is connected to a first electrode of the PIN diode. Control electrodes of the switching transistors T1 in each first group of switching units 50 are connected to a same control signal line 102, and first electrodes of the switching transistors T1 in each second group of switching units 50 are connected to a same first bias voltage line 101. Second electrodes of the PIN diodes of each first group of switching units 50 are connected to a corresponding reference voltage line 103, and the reference voltage lines 103 are connected together to a signal output line 303. In this case, by controlling the switching states of the switching transistors T1, a first bias voltage written to the first electrode of the PIN diode in each switching unit 50 can be controlled, thereby controlling the switching state of each switching unit 50. In this example, each first group of switching units 50 is controlled by only one control signal line 102, and the first bias voltage is provided to each second group of switching units 50 by only one first bias voltage line 101, so that the wiring can be greatly reduced.

Further, a plurality of first connection pads 201, a plurality of second connection pads 202 and a third connection pad 203 are further disposed on the second dielectric substrate 51, each first bias voltage line 101 is connected to one corresponding first connection pad 201 through one corresponding first fan-out trace 301, each control signal line 102 is connected to one corresponding second connection pad 201 through one corresponding second fan-out trace 302, and the signal output line 303 is connected to the third connection pad 203. In this way, a driving chip is bonded and connected to the first connection pads 201, the second connection pads 202 and the third connection pad 203, so as to provide the first bias voltage to the first bias voltage lines 101, provide the control signal to the control signal lines 102 and provide a reference voltage signal to the reference voltage lines 103. It should be noted that a signal loaded on the reference voltage lines 103 may be a ground signal.

Figure 14:
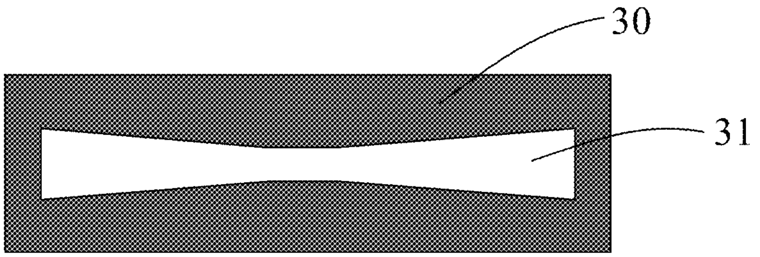
FIG. 14 is a schematic diagram of a slit opening of a holographic leaky-wave antenna according to an embodiment of the present disclosure.
Figure 15:
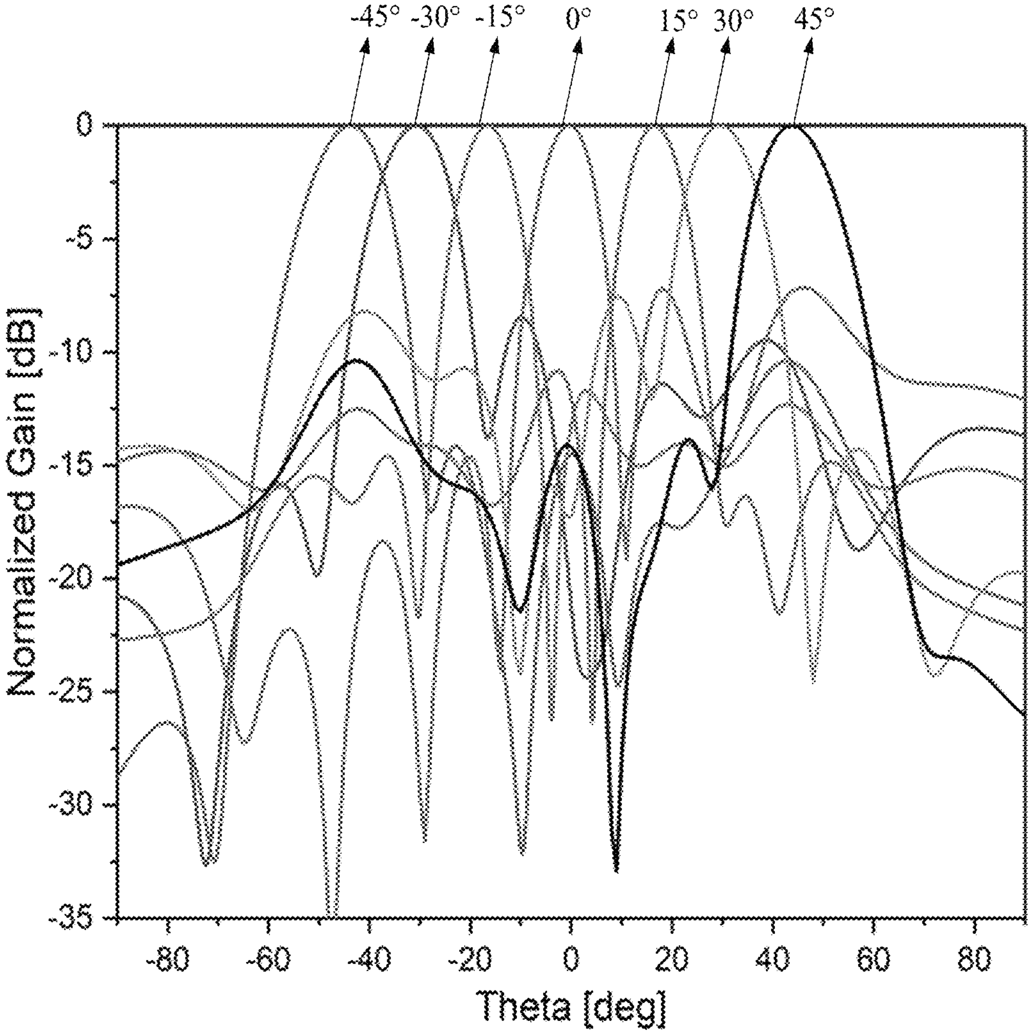
FIG. 15 illustrates radiation patterns of a holographic leaky-wave antenna with an azimuth angle Phi of 0° and respective pitch angles Theta of ±45°, ±30°, ±15°, and 0° according to an embodiment of the present disclosure.

In order to make the effect of the holographic leaky-wave antenna of the embodiment of the present disclosure clearer, the holographic leaky-wave antenna is tested only by taking an example in which a switch in the holographic leaky-wave antenna is the liquid crystal switch, and the specific test results are as follows. Referring to FIG. 1, the holographic leaky-wave antenna is an X-directional linearly polarized antenna, which adopts a single probe 40 for feeding. In order to ensure single-mode transmission in the first waveguide structure 20, a height of the first waveguide structure 20 should be less than ½ λg, where λg is a wavelength of a wave in the first waveguide structure 20. The first gap between the first dielectric substrate 10 and the first waveguide structure 20 is an air gap with a thickness of 1.2 mm. The first dielectric substrate 10 and the second dielectric substrate 51 are both glass substrates with a thickness of 0.5 mm. A slow wave dielectric layer of the first waveguide structure 20 is a PTFE (Polytetrafluoroethylene) plate with a thickness of 2.5 mm. A thickness of the liquid crystal layer 53 may be in a range from 0.001 mm to 0.1 mm, specifically 0.008 mm. For the liquid crystal molecules, $\varepsilon_{||}$ is 3.5821 and $\varepsilon_{\perp}$ is 2.4527. A thickness of each of the radiation layer 30 and the patch electrode 52 is 0.002 mm. FIG. 14 is a schematic diagram of a slit opening 31 of a holographic leaky-wave antenna according to an embodiment of the present disclosure. As shown in FIG. 14, a width of a middle portion of each slit opening 31 is not larger than that of each of two opposite ends of the slit opening 31, i.e., the two ends are wider than the middle portion, and the widths of the two ends are gradually narrowed to the width of the middle portion. As for a specific size of each slit opening 31, a length of each of the two ends of the slit opening 31 is 2.1 mm, the maximum width is 0.31 mm, and the middle portion of the slit opening 31 has a length of 0.2 mm and a width of 0.2 mm. The patch electrode 52 has a width of 0.5 mm and a length of 0.35 mm. Wave absorbing materials are attached to the periphery of the first waveguide structure 20, so that interference of non-radiated energy to the radial feed wave is avoided, and the influence of the non-radiated energy on the reproduction of the holographic interference array surface is reduced.

Figure 16:
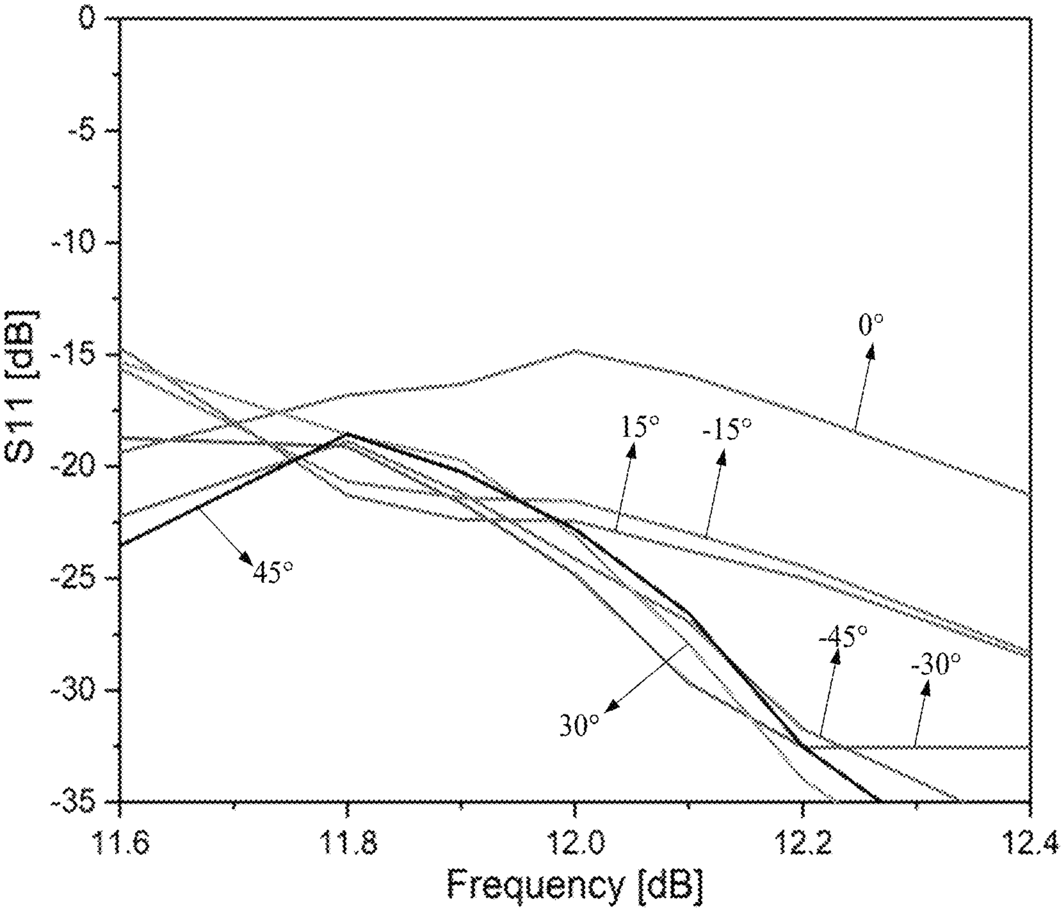
FIG. 16 illustrates S11 curves of a holographic leaky-wave antenna with an azimuth angle Phi of 0° and respective pitch angles Theta of ±45°, ±30°, ±15°, and 0° according to an embodiment of the present disclosure.
Figure 17:
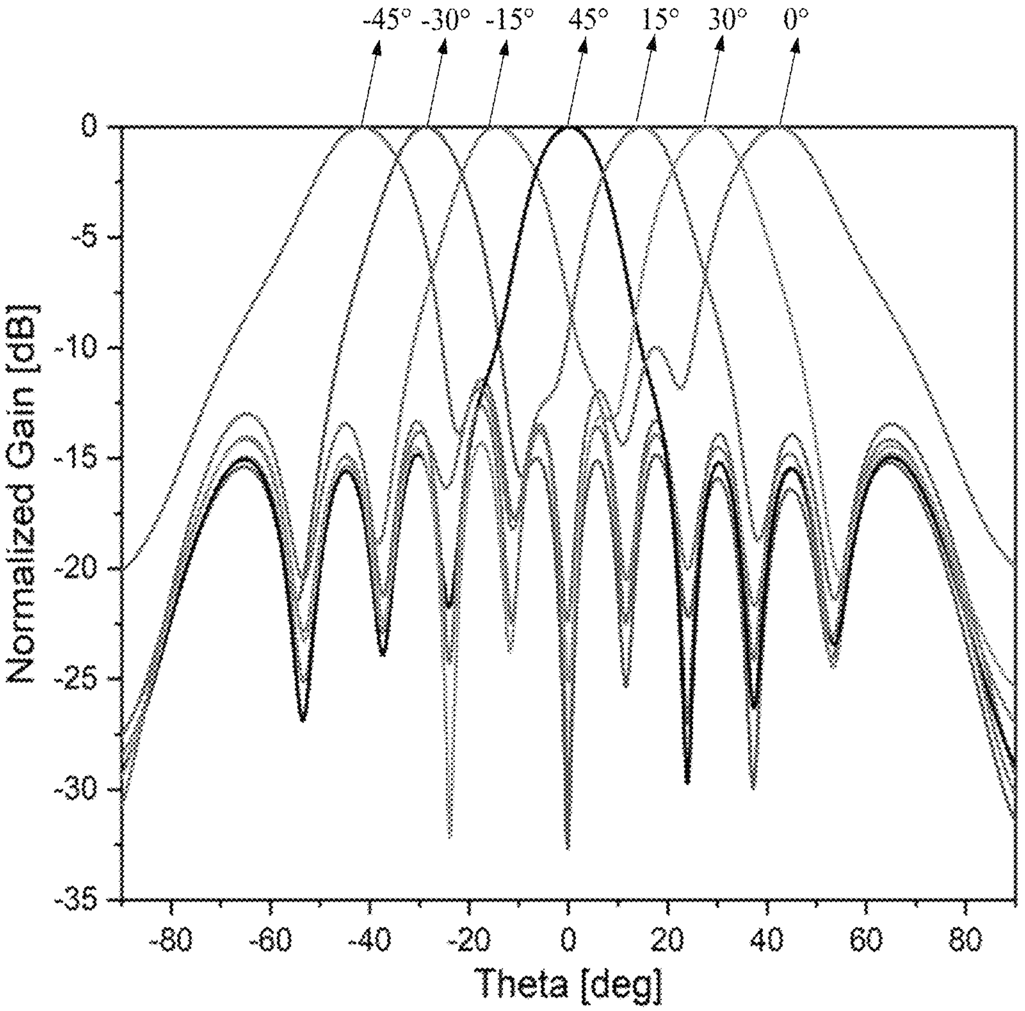
FIG. 17 illustrates radiation patterns of a holographic leaky-wave antenna with an azimuth angle Phi of 90° and respective pitch angles Theta of ±45°, ±30°, ±15°, and 0° according to an embodiment of the present disclosure.
Figure 18:
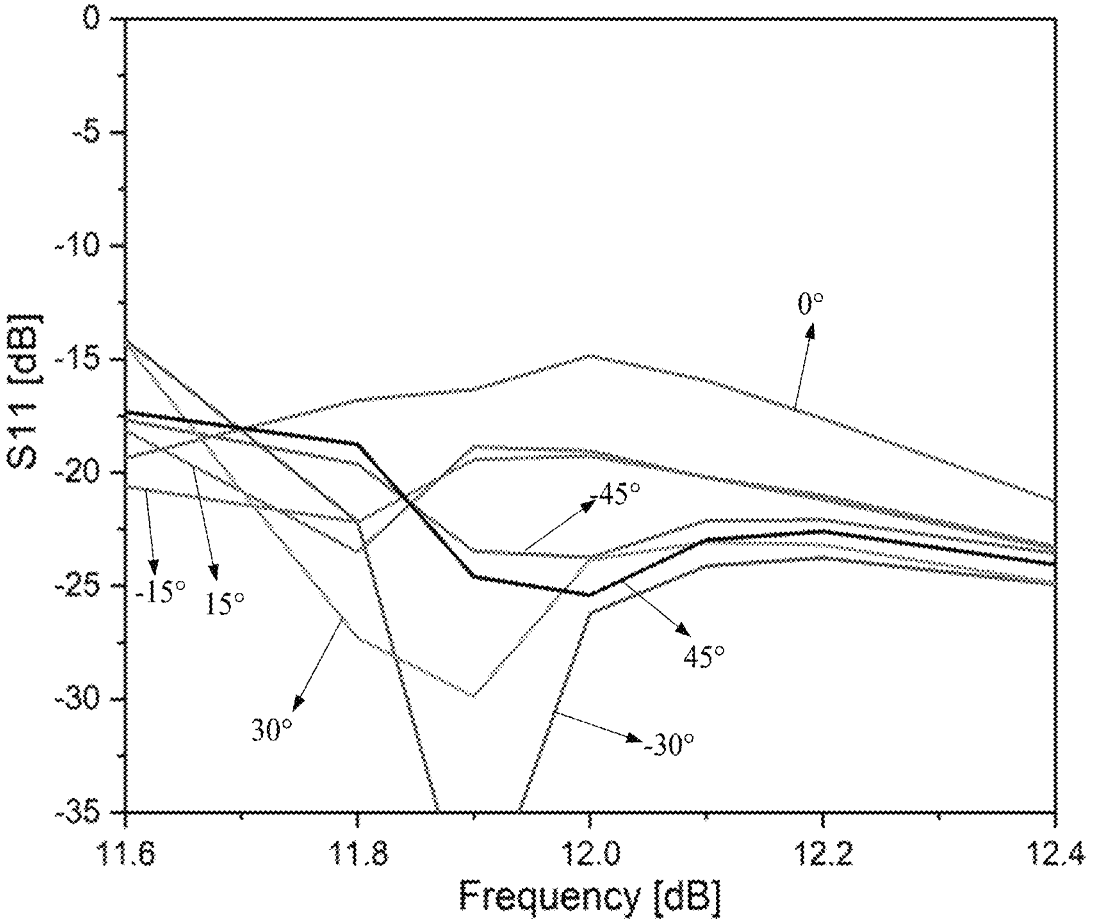
FIG. 18 illustrates S11 curves of a holographic leaky-wave antenna with an azimuth angle Phi of 90° and respective pitch angles Theta of ±45°, ±30°, ±15°, and 0° according to an embodiment of the present disclosure.

Referring to FIGS. 15 to 18, FIG. 15 illustrates radiation patterns of an antenna with an operating frequency of 12 GHz, an azimuth angle Phi of 0° and respective pitch angles Theta of ±45°, ±30°, ±15°, and 0°. FIG. 16 illustrates S11 curves of an antenna with an operating frequency of 12 GHz, an azimuth angle Phi of 0° and respective pitch angles Theta of #45°, ±30°, ±15°, and 0°. FIG. 17 illustrates radiation patterns of an antenna with an operating frequency of 12 GHz, an azimuth angle Phi of 90° and respective pitch angles Theta of ±45°, ±30°, ±15°, and 0°. FIG. 18 illustrates S11 curves of an antenna with an operating frequency of 12 GHz, an azimuth angle Phi of 90° and respective pitch angles Theta of ±45°, ±30°, ±15°, and 0°.

Figure 19:
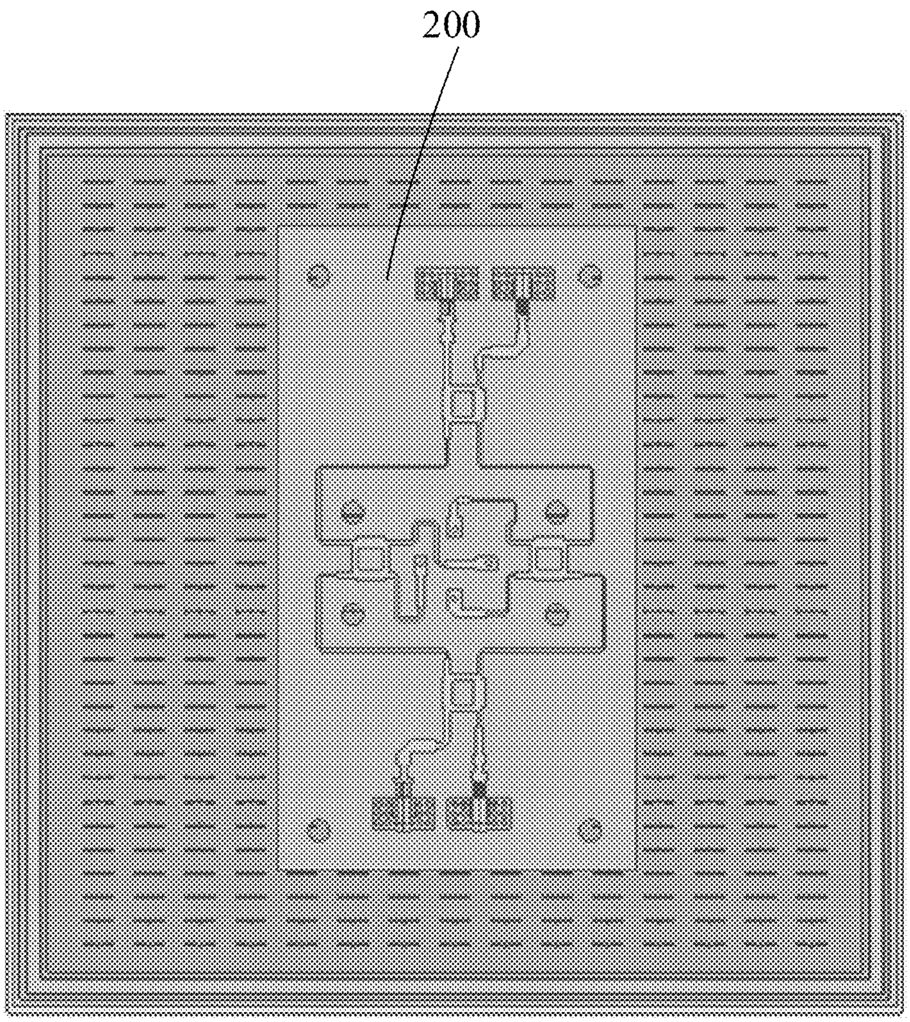
FIG. 19 is a schematic diagram of a butler network matrix board of a holographic leaky-wave antenna according to an embodiment of the present disclosure.
Figure 20:
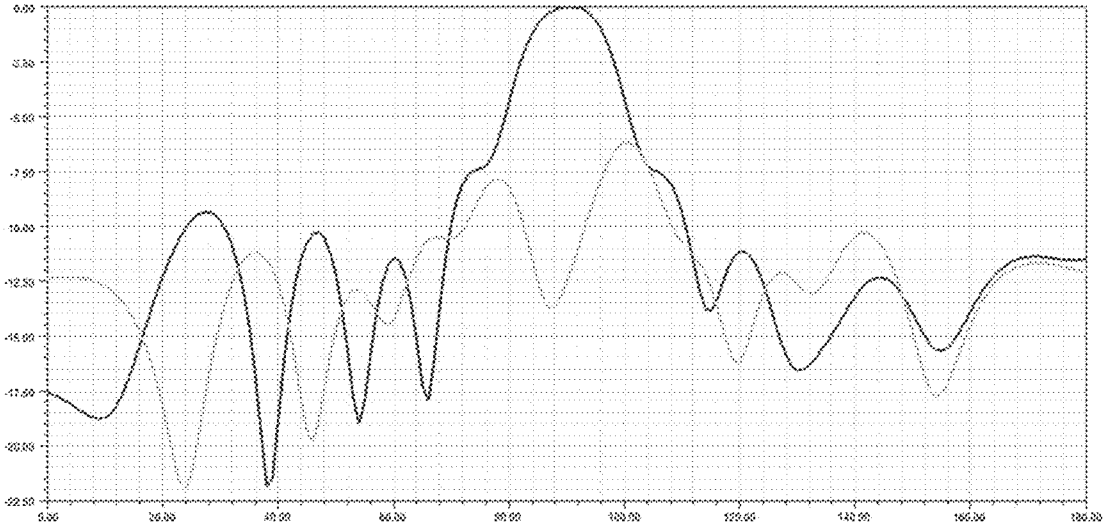
FIG. 20 illustrates a simulated normalized radiation pattern of a sum-difference beam of the holographic leaky-wave antenna of FIG. 19 with an azimuth angle Phi of 0° and a pitch angle Theta of 0°.

FIG. 19 is a schematic diagram of a butler network matrix board of a holographic leaky-wave antenna according to an embodiment of the present disclosure. In some examples, as shown in FIG. 19, when the holographic leaky-wave antenna in the embodiment of the present disclosure adopts multi-point feeding, such as the four-point feeding, the feeding structure may include not only the probe 40, but also a feeding network board, such as a butler network matrix board 200, connected to the probe 40. Four second ends of the butler network matrix board 200 are respectively connected to four probes 40, two of four first ends are connected to an absorbing load, and the other two first ends are used as feed ends for microwave signals. At this time, two independent sum-difference beams may be achieved by controlling the inputs of the two first ends of the butler network matrix board 200. FIG. 20 illustrates a simulated normalized radiation pattern of a sum-difference beam of the holographic leaky-wave antenna with an operating frequency of 12 GHz, an azimuth angle Phi of 0° and a pitch angle Theta of 0°. In the holographic leaky-wave antenna of the embodiment of the present disclosure, a single-layer flat plate is used as the first waveguide structure 20.

Figure 21:
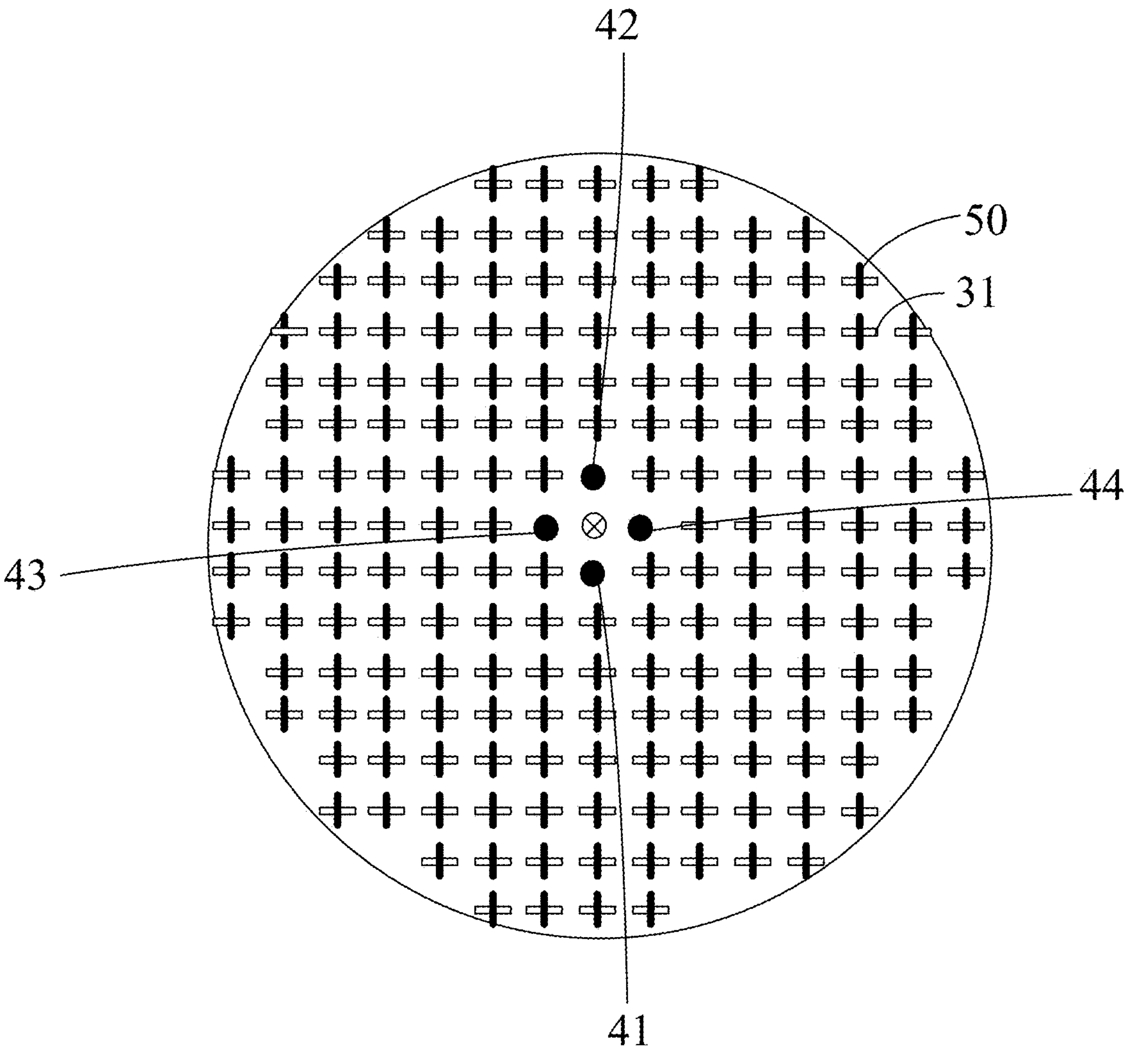
FIG. 21 is a top view of another holographic leaky-wave antenna according to an embodiment of the present disclosure.
Figure 22:
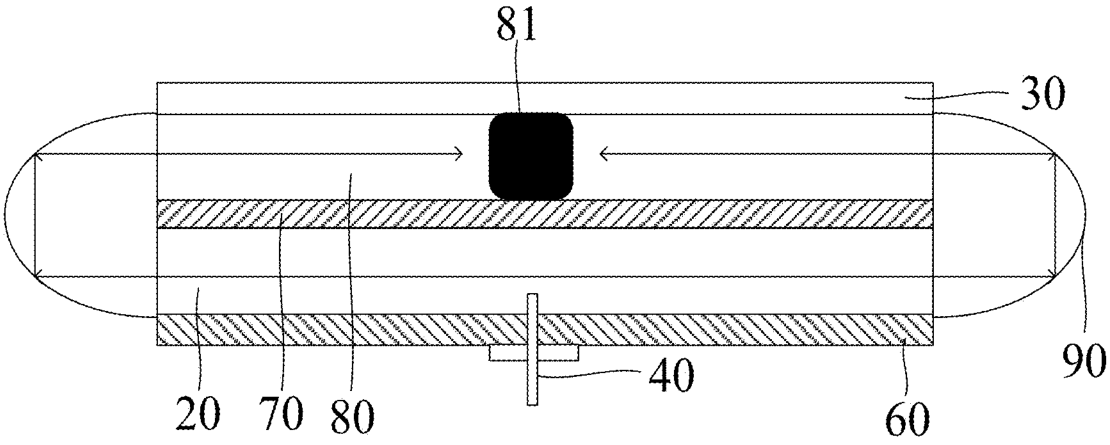
FIG. 22 is a schematic cross-sectional view of another holographic leaky-wave antenna according to an embodiment of the present disclosure.

FIG. 21 is a top view of another holographic leaky-wave antenna according to an embodiment of the present disclosure. FIG. 22 is a schematic cross-sectional view of another holographic leaky-wave antenna according to an embodiment of the present disclosure. In some embodiments, as shown in FIGS. 21 and 22, the holographic leaky-wave antenna in the present embodiment may have a double-layer parallel waveguide structure, i.e., include not only the first waveguide structure 20 described above, but also a second waveguide structure 80 disposed on a side of the radiation layer 30 close to the first waveguide structure 20, and a second reference electrode layer 70 disposed on a side of the second waveguide structure 80 close to the first waveguide structure 20.

Further, the antenna in the present example further includes a reflector member disposed at the periphery of the first waveguide structure 20 and the second waveguide structure 80. The reflector member 90 has a receiving space, at least the first waveguide structure 20, the second reference electrode layer 70 and the second waveguide structure 80 are disposed in the receiving space, and an electromagnetic wave transmitted through the first waveguide structure 20 is irradiated onto a sidewall of the reflector member 90 and then is reflected to the second waveguide structure 80 to be transmitted to the radiation layer 30. The first reference electrode layer 60 and the second reference electrode layer 70 each include, but are not limited to, a ground electrode layer. In the present embodiment, each of the first reference electrode layer 60 and the second reference electrode layer 70 is exemplified as a ground electrode.

Further, an absorbing load 81 is disposed in the second waveguide structure 80, and a center of the absorbing load 81 is located opposite to the center of the first reference electrode layer 60. The absorbing load 81 is configured to absorb the remaining guided waves, thereby preventing an electromagnetic wave from being reflected back into a waveguide feeding structure to interfere with the normal radiation of the antenna.

In a second aspect, an embodiment of the present disclosure provides an electronic apparatus, which includes the holographic antenna according to any one of the foregoing embodiments. The antenna also includes a transceiver unit, a radio frequency transceiver, a signal amplifier, a power amplifier, and/or a filter unit. The antenna may serves as a transmitting antenna or a receiving antenna. The transceiver unit may include a baseband and a receiving terminal. The baseband provides signals of at least one frequency band, for example, provides 2G signals, 3G signals, 4G signals, 5G signals, and/or the like, and sends the signals of at least one frequency band to the radio frequency transceiver. After the signals are received by a transparent antenna in a communication system, the signals may be processed by the filter unit, the power amplifier, the signal amplifier, and the radio frequency transceiver (not shown in the figure), and then are transmitted to the receiving terminal of the transceiver unit. The receiving terminal may be, for example, an intelligent gateway.

Further, the radio frequency transceiver is connected to the transceiver unit, and is configured to modulate a signal sent by the transceiver unit or demodulate a signal received by the transparent antenna and then transmit the signal to the transceiver unit. Specifically, the radio frequency transceiver may include a transmitting circuit, a receiving circuit, a modulating circuit, and a demodulating circuit. After the transmitting circuit receives multiple types of signals provided by the baseband, the modulating circuit may modulate the multiple types of signals provided by the baseband, and then send the modulated signals to the antenna. The transparent antenna receives the signals and transmits the signals to the receiving circuit of the radio frequency transceiver, the receiving circuit transmits the signals to the demodulating circuit, and the demodulating circuit demodulates the signals and transmits the demodulated signals to the receiving terminal.

Further, the radio frequency transceiver is connected to the signal amplifier and the power amplifier, the signal amplifier and the power amplifier are further connected to the filter unit, and the filter unit is connected to at least one antenna. In the process of sending a signal by a communication system, the signal amplifier can improve the signal-to-noise ratio of the signal output by the radio frequency transceiver and then transmit the signal to the filter unit, the power amplifier can amplify the power of the signal output by the radio frequency transceiver and then transmit the signal to the filter unit, the filter unit specifically includes a duplexer and a filtering circuit, the filter unit combines the signal output by the signal amplifier and the signal output by the power amplifier, filters out noise waves from the combined signal, then transmits the signal to the transparent antenna, and the antenna radiates the signal out. In the process of receiving a signal by the communication system, the signal is received by the antenna, then is transmitted to the filter unit, the signal received by the antenna is filtered by the filter unit and then transmitted by the filter unit to the signal amplifier and the power amplifier; the signal received by the antenna are gained by the signal amplifier to increase the signal-to-noise ratio of the signal; and the power amplifier amplifies the power of the signal received by the antenna. The signal received by the antenna is processed by the power amplifier and the signal amplifier, and then transmitted to the radio frequency transceiver, and the radio frequency transceiver transmits the signal to the transceiver unit.

In some examples, the signal amplifier may include various types of signal amplifiers, such as a low noise amplifier, but the present disclosure is not limited thereto.

In some examples, the antenna provided by an embodiment of the present disclosure further includes a power management unit, and the power management unit is connected to the power amplifier, to provide the power amplifier with a voltage for amplifying the signal.

It will be understood that the foregoing embodiments are merely exemplary embodiments adopted to illustrate the principles of the present disclosure, and the present disclosure is not limited thereto. It will be apparent to one of ordinary skill in the art that various modifications and improvements can be made therein without departing from the spirit and scope of the present disclosure, and such modifications and improvements are also considered to be within the scope of the present disclosure.

What is claimed is:

1. A holographic leaky-wave antenna, comprising:

a first waveguide structure;

a first dielectric substrate;

a radiation layer;

a first reference electrode layer; and a plurality of switching units;

wherein the first dielectric substrate is arranged on the first waveguide structure, and there is a first gap between the first dielectric substrate and the first waveguide structure;

the first reference electrode layer is arranged on a side of the first waveguide structure away from the first dielectric substrate;

the radiation layer is arranged on a side of the first dielectric substrate away from the first waveguide structure, and has a plurality of slit openings therein; and the first waveguide structure comprises at least one feeding port, and an orthographic projection of the at least one feeding port on the first dielectric substrate does not overlap with an orthographic projection of the first reference electrode layer on the first dielectric substrate; and the plurality of switching units are in one-to-one correspondence with the plurality of slit openings, and are configured to independently control switching states of their corresponding slit openings.

2. The holographic leaky-wave antenna of claim 1, wherein each of the plurality of switching units comprises a second dielectric substrate opposite to the first dielectric substrate, a tunable dielectric layer between the second dielectric substrate and the radiation layer, and a patch electrode on a side of the second dielectric substrate close to the tunable dielectric layer, and an orthographic projection of the patch electrode on the second dielectric substrate at least partially overlaps with an orthographic projection of a corresponding slit opening on the second dielectric substrate.

3. The holographic leaky-wave antenna of claim 2, wherein the plurality of slit openings comprise a plurality of first groups of slit openings arranged side by side in a second direction, and the slit openings of each first group of slit openings are arranged side by side in a first direction; the plurality of switching units comprise a plurality of first groups of switching units arranged side by side in the second direction, and the switching units of each first group of switching units are arranged side by side in the first direction; and patch electrodes of every two adjacent first groups of switching units define a first region therebetween, the holographic leaky-wave antenna further comprises a group of first bias voltage lines arranged in the first region and on the second dielectric substrate, and first bias voltage lines of the group of first bias voltage lines are connected to the patch electrodes of one first group of switching units of the two adjacent first groups of switching units in one-to-one correspondence.

4. The holographic leaky-wave antenna of claim 3, wherein the holographic leaky-wave antenna further comprises a plurality of first connection pads on the second dielectric substrate, and each of the first bias voltage lines is connected to one corresponding first connection pad through one corresponding first fan-out trace.

5. The holographic leaky-wave antenna of claim 2, wherein the plurality of slit openings comprise a plurality of first groups of slit openings arranged side by side in a second direction and a plurality of second groups of slit openings arranged side by side in a first direction, the slit openings of each first group of slit openings are arranged side by side in the first direction, the slit openings of each second group of slit openings are arranged side by side in the second direction; the plurality of switching units comprise a plurality of first groups of switching units arranged side by side in the second direction and a plurality of second groups of switching units arranged side by side in the first direction, the switching units of each first group of switching units are arranged side by side in the first direction, and the switching units of each second group of switching units are arranged side by side in the second direction; and each of the plurality of switching units further comprises a switching transistor on the second dielectric substrate, a second electrode of the switching transistor in each of the plurality of switching units is connected to the patch electrode, control electrodes of the switching transistors in each of the plurality of first groups of switching units are connected to a same control signal line, and first electrodes of the switching transistors in each of the plurality of second groups of switching units are connected to a same first bias voltage line.

6. The holographic leaky-wave antenna of claim 5, wherein the holographic leaky-wave antenna further comprises a plurality of first connection pads and a plurality of second connection pads on the second dielectric substrate, each first bias voltage line is connected to one corresponding first connection pad through one corresponding first fan-out trace, and each control signal line is connected to one corresponding second connection pad through one corresponding second fan-out trace.

7. The holographic leaky-wave antenna of claim 1, wherein each of the plurality of switching units comprises a PIN diode on the first dielectric substrate and at a position corresponding to a corresponding slit opening.

8. The holographic leaky-wave antenna of claim 7, wherein the plurality of slit openings comprise a plurality of first groups of slit openings arranged side by side in a second direction, and the slit openings of each first group of slit openings are arranged side by side in a first direction; the plurality of switching units comprise a plurality of first groups of switching units arranged side by side in the second direction, and the switching units of each first group of switching units are arranged side by side in the first direction;

patch electrodes of every two adjacent first groups of switching units define a first region therebetween, the holographic leaky-wave antenna further comprises a group of first bias voltage lines arranged in the first region and on the second dielectric substrate, and first bias voltage lines of the group of first bias voltage lines are connected to first electrodes of the PIN diodes of the corresponding first group of switching units in one-to-one correspondence; and second electrodes of the PIN diodes of each first group of switching units is connected to a corresponding reference voltage line, and the reference voltage lines are connected together to a signal output line.

9. The holographic leaky-wave antenna of claim 8, wherein the holographic leaky-wave antenna further comprises a plurality of first connection pads and a third connection pad on the first dielectric substrate, each first bias voltage line is connected to one corresponding first connection pad through one corresponding first fan-out trace, and the signal output line is connected to the third connection pad.

10. The holographic leaky-wave antenna of claim 7, wherein the plurality of slit openings comprise a plurality of first groups of slit openings arranged side by side in a second direction and a plurality of second groups of slit openings arranged side by side in a first direction, the slit openings of each first group of slit openings are arranged side by side in the first direction, the slit openings of each second group of slit openings are arranged side by side in the second direction; the plurality of switching units comprise a plurality of first groups of switching units arranged side by side in the second direction and a plurality of second groups of switching units arranged side by side in the first direction, the switching units of each first group of switching units are arranged side by side in the first direction, and the switching units of each second group of switching units are arranged side by side in the second direction; and each switching unit further comprises a switching transistor on the second dielectric substrate, a second electrode of the switching transistor in each switching unit is connected to a first electrode of the PIN diode, control electrodes of the switching transistors in each first group of switching units are connected to a same control signal line, first electrodes of the switching transistors in each second group of switching units are connected to a same first bias voltage line, second electrodes of the PIN diodes of each first group of switching units is connected to a corresponding reference voltage line, and the reference voltage lines are connected together to a signal output line.

11. The holographic leaky-wave antenna of claim 10, wherein the holographic leaky-wave antenna further comprises a plurality of first connection pads, a plurality of second connection pads, and a third connection pad on the second dielectric substrate, each first bias voltage line is connected to one corresponding first connection pad through one corresponding first fan-out trace, each control signal line is connected to one corresponding second connection pad through one corresponding second fan-out trace, and the signal output line is connected to the third connection pad.

12. The holographic leaky-wave antenna of claim 1, wherein a width of each of two opposite ends of each of the plurality of slit openings is not less than a width of a middle portion of the slit opening.

13. The holographic leaky-wave antenna of claim 1, further comprising a feeding structure configured to excite a microwave signal through the at least one feeding port, wherein the feeding structure comprises a plurality of coaxial probes, and each of the plurality of coaxial probes is arranged at a location corresponding to one feeding port.

14. The holographic leaky-wave antenna of claim 13, wherein the feeding structure further comprises a butler network matrix board electrically connected to the plurality of coaxial probes.

15. The holographic leaky-wave antenna of claim 1, wherein the at least one feeding port comprises four feeding ports which are a first feeding port, a second feeding port, a third feeding port, and a fourth feeding port, a connection line between a center of the first feeding port and a center of the second feeding port is a first line segment, a connection line between a center of the third feeding port and a center of the fourth feeding port is a second line segment, and the first line segment and the second line segment are perpendicular to each other.

16. The holographic leaky-wave antenna of claim 15, wherein the center of first feeding port, the center of the second feeding port, the center of the third feeding port and the center of the fourth feeding port each have a same distance, which is a first distance, from a center of the first waveguide structure.

17. The holographic leaky-wave antenna of claim 16, wherein the first distance ranges from 3 mm to 8 mm.

18. The holographic leaky-wave antenna of claim 1, wherein the holographic leaky-wave antenna further comprises a wave absorbing material attached to a periphery of the first waveguide structure, or wherein the radiation layer comprises at least two slit openings extending in different directions.

19. The holographic leaky-wave antenna of claim 1, further comprising:

a second waveguide structure on a side of the radiation layer close to the first waveguide structure, and a second reference electrode layer on a side of the second waveguide structure close to the first waveguide structure; and an absorbing load disposed in the second waveguide structure.

20. An electronic apparatus, comprising the holographic leaky-wave antenna of claim 1.

* * * * *